(12) United States Patent
Fu et al.

(10) Patent No.: US 10,230,797 B2
(45) Date of Patent: Mar. 12, 2019

(54) INFORMATION PROCESSING METHOD, DEVICE, AND SYSTEM

(71) Applicant: TENCENT TECHNOLOGY (SHENZHEN) COMPANY LIMITED, Shenzhen (CN)

(72) Inventors: Yingran Fu, Shenzhen (CN); Xing Li, Shenzhen (CN); Shenxing Yuan, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 344 days.

(21) Appl. No.: 15/148,941

(22) Filed: May 6, 2016

(65) Prior Publication Data

US 2016/0255151 A1 Sep. 1, 2016

Related U.S. Application Data

(63) Continuation of application No. PCT/CN2015/073064, filed on Feb. 13, 2015.

(30) Foreign Application Priority Data

Feb. 19, 2014 (CN) .......................... 2014 1 0056843

(51) Int. Cl.
*H04L 29/08* (2006.01)
*G06F 21/10* (2013.01)
(Continued)

(52) U.S. Cl.
CPC .......... *H04L 67/1097* (2013.01); *G06F 21/10* (2013.01); *H04L 67/327* (2013.01); *H04N 21/262* (2013.01); *H04N 21/437* (2013.01)

(58) Field of Classification Search
CPC . H04L 67/1097; H04L 67/327; H04N 21/437; H04N 21/262
(Continued)

(56) References Cited

U.S. PATENT DOCUMENTS 6,658,027 B1  12/2003  Kramer et al.
6,859,460 B1 *  2/2005  Chen ................. H04L 29/06027
                                                      370/412

(Continued)

FOREIGN PATENT DOCUMENTS

CN       1399462 A     2/2003
CN       1531276 A     9/2004
(Continued)

OTHER PUBLICATIONS

International Search Report in international application No. PCT/CN2015/073064, dated May 20, 2015.
(Continued)

*Primary Examiner* — Farzana B Huq
(74) *Attorney, Agent, or Firm* — Oppedahl Patent Law Firm LLC

(57) ABSTRACT

The present disclosure discloses an information processing method, device, and system. The method includes: creating, by a server when detecting a task creation request, an information processing task according to a resource used for information playback and a pre-determined amount of the resource; detecting a feature value of the information playback after acquiring the information processing task; adjusting, if the feature value of the information playback is less than or equal to a preset threshold, the number of times of information playback according to the pre-determined amount of the resource by using a first playback policy, to delay reaching the pre-determined amount of the resource, and generating a corresponding playback task according to (Continued)

the resource and the first playback policy; adjusting, if the feature value of the information playback is greater than the preset threshold, the number of times of information playback according to the pre-determined amount of the resource by using a second playback policy, to reach the pre-determined amount of the resource in advance, and generating a corresponding playback task according to the resource and the second playback policy; and sending the playback task. By means of the present disclosure, a pre-determined amount of a resource can be completed in advance or a delay can be implemented in reaching a pre-determined amount of a resource.

17 Claims, 3 Drawing Sheets

(51) Int. Cl.
*H04N 21/262* (2011.01)
*H04N 21/437* (2011.01)

(58) Field of Classification Search
USPC .......................................................... 709/219
See application file for complete search history.

(56) References Cited

U.S. PATENT DOCUMENTS

| 8,363,673 | B2 | 1/2013 | Wang | |
|---|---|---|---|---|
| 2002/0040403 | A1* | 4/2002 | Goldhor | G10L 21/04 |
| | | | | 709/231 |
| 2003/0212997 | A1* | 11/2003 | Hejna, Jr. | H04L 29/06 |
| | | | | 725/88 |
| 2004/0044783 | A1* | 3/2004 | Nordberg | H04L 47/18 |
| | | | | 709/231 |
| 2007/0192782 | A1 | 8/2007 | Ramaswamy | |
| 2008/0172671 | A1 | 7/2008 | Bouillet | |
| 2009/0016333 | A1* | 1/2009 | Wang | H04L 65/80 |
| | | | | 370/389 |
| 2012/0137324 | A1 | 5/2012 | E | |
| 2014/0156863 | A1* | 6/2014 | Gao | H04L 65/4084 |
| | | | | 709/231 |

FOREIGN PATENT DOCUMENTS

| CN | 1756230 | A | 4/2006 |
|---|---|---|---|
| CN | 1984057 | A | 6/2007 |
| CN | 101119323 | A | 2/2008 |
| CN | 101631036 | A | 1/2010 |
| CN | 102137284 | A | 7/2011 |
| CN | 102223358 | A | 10/2011 |
| CN | 102413379 | A | 4/2012 |
| CN | 102479369 | A | 5/2012 |
| CN | 102750320 | A | 10/2012 |
| CN | 103260062 | A | 8/2013 |
| KR | 20090060059 | A | 6/2009 |

OTHER PUBLICATIONS

English Translation of the Written Opinion of the International Search Authority in international application No. PCT/CN2015/073064, dated May 20, 2015.

Notification of the First Office Action of Chinese application No. 201410056843.3, dated Aug. 15, 2018.

International Preliminary Report on Patentability for Application No. PCT/CN2008/072437, dated Mar. 24, 2010.

International Search Report for Application No. PCT/CN2008/072437, dated Jan. 15, 2009.

Written Opinion for Application No. PCT/CN20081072437, dated Dec. 19, 2008.

* cited by examiner

INFORMATION PROCESSING METHOD, DEVICE, AND SYSTEM

CROSS REFERENCE TO RELATED APPLICATIONS

This is a continuation application of International Patent Application No. PCT/CN2015/073064, filed on Feb. 13, 2015, which claims priority to Chinese Patent Application No. 2014100568433 filed on Feb. 19, 2014, the disclosure of which is incorporated by reference herein in its entirety.

FIELD OF THE TECHNOLOGY

The present disclosure relates to Internet technologies, and in particular, to an information processing method, device, and system.

BACKGROUND OF THE DISCLOSURE

With the rapid development of Internet technologies, the information amount in networks grows exponentially, and a manner in which before an application (or media content) required by a user is loaded, information spreading is performed by playing (exposing) information to the user is widely used.

In the existing technology, when the number of times of playback of information within a preset time needs to reach a pre-determined amount, first it is required to predict an information playback inventory, that is, a playback amount (exposure amount) of the information when users load network applications in a time period; and an information processing task is created according to the predicted information playback inventory and the pre-determined amount, to determine which resource is to be used to play the information, duration (how many days) in which the information is to be played, and the number of times that the information is to be played by using the resource in each day, that is, a pre-determined amount for the same day. Herein, the resource is which position in a page of a client that provides an application to a terminal user (that is, an information playback client) is available for information playback, directional information of information playback (for different groups), and the number of times that the information can be played within the preset time.

When information playback time specified in the information processing task begins, a playback task corresponding to a preset time granularity (for example, in the unit of day) is generated according to a resource specified in the information processing task, where the playback task instructs to: within the preset time granularity, provide the information played by the information playback client of the resource and the number of times of playback of the information, so that the information playback client performs a corresponding operation, to play the information to the terminal user.

The existing technology has the following problems: Because the number of times that the user accesses the information playback client that provides the application to load the application on the terminal cannot be accurately predicted, that is, the number of times, provided by the resource, that the information can be played cannot be precisely determined, it is caused that when one information processing task is completed, an actual playback amount of the information is usually inconsistent with the pre-determined amount; therefore, when the actual playback amount of the information does not reaches the pre-determined amount of the resource, a new information processing task further needs to be created, to make up the difference between the pre-determined amount for information playback and the actual playback amount, which usually affects the expected effect of information playback; and when the actual playback amount of the information exceeds the pre-determined amount, additional consumption of the information playback inventory is caused and the information spreading cost is increased.

In conclusion, in the existing technology, there is no effective technical solution yet for how to complete a pre-determined amount of a resource in advance, or how to delay completing a pre-determined amount of a resource in a case in which the resource is popular.

SUMMARY

Embodiments of the present invention provide an information processing method, device, and system, which support to complete a pre-determined amount of a resource in advance, or implement a delay in reaching a pre-determined amount of a resource, so that information can be played within a preset time for a precise number of times, to achieve the expected effect of information spreading, and no waste is caused to an information playback inventory.

Technical solutions of the embodiments of the present invention are implemented as follows:

An embodiment of the present invention provides an information processing method, including:

creating, by a server when detecting a task creation request, an information processing task according to a resource used for information playback and a pre-determined amount of the resource;

detecting a feature value of the information playback after acquiring the information processing task;

adjusting, if the feature value of the information playback is less than or equal to a preset threshold, the number of times of information playback according to the pre-determined amount of the resource by using a first playback policy, to delay reaching the pre-determined amount of the resource, and generating a corresponding playback task according to the resource and the first playback policy;

adjusting, if the feature value of the information playback is greater than the preset threshold, the number of times of information playback according to the pre-determined amount of the resource by using a second playback policy, to reach the pre-determined amount of the resource in advance, and generating a corresponding playback task according to the resource and the second playback policy; and sending the playback task.

An embodiment of the present invention further provides an information processing method, including:

sending, by a client, a task creation request;

receiving, by the client, a playback task; and playing corresponding information according to the playback task, so as to adjust, when a feature value of information playback is less than or equal to a preset threshold, the number of times of information playback according to a pre-determined amount of a resource by using a first playback policy, to delay reaching the pre-determined amount of the resource; and adjust, when the feature value of the information playback is greater than the preset threshold, the number of times of information playback according to the pre-determined amount of the resource by using a second playback policy, to reach the pre-determined amount of the resource in advance.

An embodiment of the present invention further provides a server, including:

a task creation unit, configured to create, when a task creation request is detected, an information processing task according to a resource used for information playback and a pre-determined amount of the resource;

an acquisition unit, configured to detect a feature value of the information playback after acquiring the information processing task;

a playback task generation unit, configured to adjust, when the feature value of the information playback is less than or equal to a preset threshold, the number of times of information playback according to the pre-determined amount of the resource by using a first playback policy, to delay reaching the pre-determined amount of the resource, and generate a corresponding playback task according to the resource and the first playback policy, the playback task generation unit being further configured to adjust, when the feature value of the information playback is greater than the threshold, the number of times of information playback according to the pre-determined amount of the resource by using a second playback policy, to reach the pre-determined amount of the resource in advance, and generate a corresponding playback task according to the resource and the second playback policy; and a sending unit, configured to send the playback task generated by the playback task generation unit.

An embodiment of the present invention further provides a client, including:

a task request unit, configured to send a task creation request;

a receiving unit, configured to receive a playback task; and a playback unit, configured to play corresponding information according to the playback task, so as to adjust, when a feature value of information playback is less than or equal to a preset threshold, the number of times of information playback according to a pre-determined amount of a resource by using a first playback policy, to delay reaching the pre-determined amount of the resource; and adjust, when the feature value of the information playback is greater than the preset threshold, the number of times of information playback according to the pre-determined amount of the resource by using a second playback policy, to reach the pre-determined amount of the resource in advance.

An embodiment of the present invention further provides an information processing system, including the server and the client.

In the information processing method, device, and system provided in the embodiments of the present invention, different playback policies are determined according to a relationship between a feature value of information playback and a preset threshold, which can complete a pre-determined amount of a resource in advance, or implement a delay in reaching a pre-determined amount of a resource, so that a problem of a large difference between an actual playback amount and the pre-determined amount when an information processing task ends can be avoided, the expected effect of information playback is ensured, and no waste is caused to an information playback inventory.

DESCRIPTION OF EMBODIMENTS

In the process of implementing the present disclosure, the inventor discovers that, in the existing technology, information playback is always performed according to a pre-determined amount in a playback task, but during actual application, the actual number of times that information is played by using a resource has an unpredictable fluctuation, which causes a difference between an actual playback amount of the information and the pre-determined amount; the inventor also discovers that, if a minimum playback amount and a maximum playback amount of the number of times that information is played by using a resource can be set in addition to a pre-determined amount to make the number of times of playback of the information at least be the minimum playback amount and not exceed the maximum playback amount, a pre-determined amount corresponding to the resource can be completed in an information processing task and no waste is caused to an information playback inventory by occurrence of an excessively large number of times of information playback.

Detailed description is further made below with reference to the accompanying drawings and specific embodiments.

Figure 1:
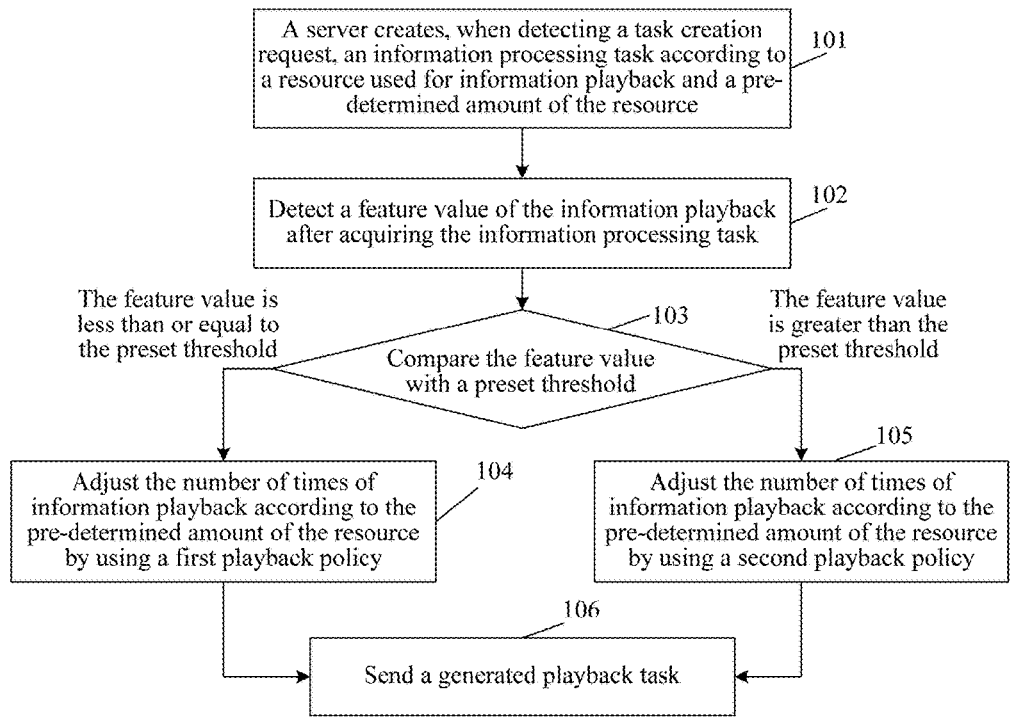
FIG. 1 is a first schematic flowchart of implementation of an information processing method in an embodiment of the present invention.

An embodiment of the present invention records an information processing method, which can be applied to a server that manages information playback. FIG. 1 is a flowchart of the information processing method in this embodiment of the present invention. As shown in FIG. 1, the method includes:

Step 101: A server creates, when detecting a task creation request, an information processing task according to a resource used for information playback and a pre-determined amount of the resource.

Step 102: Detect a feature value of the information playback after acquiring the information processing task.

Step 103: Compare the feature value with a preset threshold, and if the feature value of the information playback is less than or equal to the preset threshold, perform step 104 and step 106; and if the feature value of the information playback is greater than the preset threshold, perform step 105 and step 106.

Step 104: Adjust the number of times of information playback according to the pre-determined amount of the resource by using a first playback policy, to delay reaching the pre-determined amount of the resource, and generate a corresponding playback task according to the resource and the first playback policy.

Step 105: Adjust the number of times of information playback according to the pre-determined amount of the resource by using a second playback policy, to reach the pre-determined amount of the resource in advance, and generate a corresponding playback task according to the resource and the second playback policy.

Step 106: Send the generated playback task.

The feature value represents a popularity degree of the resource used by the information playback, and the preset threshold may be set according to a different scenario.

In an implementation manner, the detecting a feature value of the information playback after acquiring the information processing task may be implemented by performing the following processing:

triggering the detection after acquiring the information processing task, to acquire a historical record of the information playback; and analyzing the historical record of the information playback, to obtain the feature value of the information playback.

In an implementation manner, step 104 may be implemented in the following manner: determining, according to the pre-determined amount of the resource, a minimum playback amount and a maximum playback amount of the number of times that information is played within a current time granularity by using the resource, and increasing, when the minimum playback amount is met, the number of times of information playback by using the first playback policy that is a playback policy of increasing the number of times of playback; and generating the playback task according to the resource, the minimum playback amount, the maximum playback amount, and the playback policy of increasing the number of times of playback.

In an implementation manner, step 105 may be implemented in the following manner: determining, according to the pre-determined amount of the resource, a minimum playback amount and a maximum playback amount of the number of times that information is played within a current time granularity by using the information playback resource, and decreasing, when the maximum playback amount is met, the number of times of information playback by using the second playback policy that is a playback policy of decreasing the number of times of playback; and generating the playback task according to the resource, the minimum playback amount, the maximum playback amount, and the playback policy of decreasing the number of times of playback.

In an implementation manner, after the playback task is generated, it is also feasible to determine a playback task, in a current playback task, that does not complete the minimum playback amount, and instruct to play, according to the playback task, corresponding information, where the number of times of playback of the corresponding information reaches the minimum playback amount corresponding to the playback task; and instruct to play, according to the playback task, the corresponding information after the minimum playback amount corresponding to the playback task is completed, where the number of times of playback of the corresponding information does not exceed the maximum playback amount corresponding to the playback task.

The server determines, according to the pre-determined amount of the resource in the information processing task, the minimum playback amount and the maximum playback amount of the number of times that information is played within the current time granularity by using the resource.

The information processing task is described in the unit of different time granularities, and includes a resource corresponding to the different time granularities, a pre-determined amount of the resource. The pre-determined amount of the resource refers to a planned number of times of that corresponding information is played by using the resource within a time granularity corresponding to the resource.

During actual application, after acquiring an information processing task, the server first needs to determine a valid resource within a current time granularity, that is, a resource whose validity period is within the current time granularity. It should be noted that, resources in embodiments of the present invention all are valid resources; and the size of the time granularity may be set according to an actual requirement, and generally, one time granularity corresponds to a time length of one day.

In an implementation manner, the determining, according to the pre-determined amount of the resource, a minimum playback amount and a maximum playback amount of the number of times that information is played within a current time granularity by using the information playback resource may be implemented in the following manner:

determining a product of the pre-determined amount of the resource and a first coefficient as the minimum playback amount; and determining a first sum obtained by adding up a compensation amount corresponding to the resource and a product of the pre-determined amount of the resource and a second coefficient, as the maximum playback amount, where the first coefficient is less than 1, the second coefficient is greater than 1, and the compensation amount corresponding to the resource is a first difference obtained by subtracting a second sum of pre-determined amounts of the resource before the current time granularity by the number of times that the information is already played before the current time granularity by using the resource.

Herein, the pre-determined amount of the resource refers to a pre-determined amount of the resource within the current time granularity.

Description is made below by using an example. When an information processing task includes four days, a same resource is used to play information in each day, and a pre-determined amount for each day is 100, when the first coefficient is 0.8, the minimum playback amount for each day is 80 (that is, 100*0.8), and when the second coefficient is 1.2, the maximum playback amount for each day is equal to [120 (that is, 100*1.2) plus a compensation amount for the same day]. Determining the compensation amount for the same day is described below. Assuming that it is currently in the third day in the information processing task and actual playback amounts of information in the first day and the second day are 80 and 90 respectively, a compensation amount for the third day is a difference obtained by subtracting a sum of the pre-determined amount for the first day and the pre-determined amount for the second day 200 (that is, 100+100) by a sum of the actual playback amounts of information in the first day and the second day 170 (that is, 80+90), that is, 30 (that is, 200−170).

During actual application, because of consideration that the number of times of playback of information is reduced due to network routing during geographical directional playback of the information, an extra playback amount is additionally set for a pre-determined amount corresponding to each time granularity, which is a preset proportion (less than 1) of the pre-determined amount, for example, 5%, to ensure that when the information processing task is completed, it is not caused that the number of times of information playback is less than a total pre-determined amount of information in the information processing task due to network routing; correspondingly, the extra playback amount is correspondingly added to both the maximum playback amount and the minimum playback amount, that is, a sum of the extra playback amount and the product of the pre-determined amount of the resource and the first coefficient is determined as the minimum playback amount; and a first sum obtained by adding up the product of the pre-determined amount of the resource and the second coefficient, the compensation amount corresponding to the resource, and the extra playback amount is determined as the maximum playback amount.

In this implementation manner, the minimum playback amount may be indicated by using the following formula:

the minimum playback amount=the pre-determined amount of the resource*the first coefficient+the extra playback amount; and the maximum playback amount may be indicated by using the following formula:

the maximum playback amount=the pre-determined amount of the resource*the second coefficient+ the compensation amount of the resource+the extra playback amount.

In another implementation manner, the determining, according to the pre-determined amount of the resource, a minimum playback amount and a maximum playback amount of the number of times that information is played within a current time granularity by using the information playback resource may be implemented in the following manner:

determining a product of the pre-determined amount of the resource and a first coefficient as the minimum playback amount;

determining a first sum as the maximum playback amount when the first sum is less than the minimum playback amount and is less than a second difference; and determining a minimum value in the minimum playback amount and the second difference as the maximum playback amount when the first sum is greater than the minimum playback amount or greater than the second difference, where the first sum is obtained by adding up the compensation amount corresponding to the resource and the product of the pre-determined amount of the resource and a second coefficient, and the second difference is a second difference obtained by subtracting a total pre-determined amount of the resource by the number of times that the information is already played before the current time granularity by using the resource and a product of a third sum of pre-determined amounts of the resource after the current time granularity (including the current time granularity) and the first coefficient.

The total pre-determined amount of the resource is a sum of pre-determined amounts of the resource for all time granularities in the information processing task. For example, when an information processing task includes four days, a same resource is used to play information in each day, and a pre-determined amount for each day is 100, the total pre-determined amount of the resource is 400 (that is, 100*4); and if a current time granularity is the second day, a corresponding second difference is: 300 (that is, 400–100, where 100 is the pre-determined amount for the first day)– 100*3 (which is a sum of the pre-determined amounts for the second day, the third day, and the fourth day)*the first coefficient.

In this implementation manner, the minimum playback amount may be indicated by using the following formula:

the minimum playback amount=the pre-determined amount of the resource*the first coefficient; and the maximum playback amount may be indicated by using the following formula:

MIN{(the pre-determined amount of the resource*the second coefficient+the compensation amount of the resource),MAX[(the pre-determined amount of the resource*the first coefficient+the compensation amount of the resource),(the total pre-determined amount of the resource–the number of times that the information is already played by using the resource– the product of the third sum of the pre-determined amounts of the resource after the current time granularity and the first coefficient)]}, where MIN indicates to obtain a minimum value, and MAX indicates to obtain a maximum value.

It should be noted that, during actual application, to avoid a case in which the value is a decimal or is less than 1, the result in the foregoing parentheses is rounded up; certainly, another manner may also be used to ensure that the value of the maximum playback amount is a decimal or is less than 1, for example, the maximum playback amount may also be indicated by using the following formula:

MIN{(the pre-determined amount of the resource*the second coefficient+the compensation amount of the resource),MAX[(the pre-determined amount of the resource*the first coefficient+the compensation amount of the resource),(the total pre-determined amount of the resource–the number of times that the information is already played by using the resource– the product of the third sum of the pre-determined amounts of the resource after the current time granularity and the first coefficient),1]}.

Correspondingly, when an extra playback amount is introduced in this implementation manner, the minimum playback amount is indicated by using the following formula:

the minimum playback amount=the pre-determined amount of the resource*the first coefficient+the extra playback amount; and the maximum playback amount is indicated by using the following formula:

MIN{(the pre-determined amount of the resource*the second coefficient+the compensation amount of the resource+an extra playback amount),MAX[(the pre-determined amount of the resource*the first coefficient+the compensation amount of the resource+the extra playback amount),(the total pre-determined amount of the resource+a total extra playback amount–the number of times that the information is already played by using the resource–the product of the third sum of the pre-determined amounts of the resource after the current time granularity and the first coefficient),1]}.

Herein, because an extra playback amount corresponds to a time granularity, the total extra playback amount is a sum of extra playback amounts corresponding to time granularities in the information processing task.

During actual application, there are multiple playback tasks. In this implementation manner, information is played according to a maximum playback amount in a playback task only after minimum playback amounts of all the playback tasks are completed, so that the number of times of playback of the corresponding information reaches the maximum playback amount; in this way, when pre-determined amounts for all time granularities are completed within a time granularity that is early in an information processing task, it can be avoided that corresponding information is still played by using the resource within a subsequent time granularity and that waste is caused to an information playback inventory.

Description is made below by using an example. When an information processing task includes four days, a same resource is used to play information in each day, and a pre-determined amount for each day is 100, the following case occurs in the existing technology: assuming that an actual number of times that information is played in the first two days by using the resource is 500, that is, exceeds a total pre-determined amount 400 (that is, 4*100) of the resource in the information processing task, according to a processing process of the existing technology, corresponding information is still played according to the pre-determined amount 100 in the second two days in the information processing task, and if actual playback amounts in the second two days are both 100, an actual playback amount of information when the information processing task ends is 700 (that is, 500+2*100), which causes waste to an information playback inventory. The following case also occurs in the existing technology: In the first two days of the information processing task, the actual numbers of times that information is played by using the resource are small, assumed to be 50 and 30; as a result, when the information processing task is completed, an actual number of times of playback of the information is less than a total pre-determined amount 400, the expected spreading effect of the information is affected, and a new information processing task further needs to be created to complement the number of times of playback.

If the technical solutions in this embodiment are used, assuming that the first coefficient is 0.8 and the second coefficient is 1.2, in this way, a playback amount of information in each day is not less than 80 (that is, 100*0.8), for example, it is currently the second day in the information processing task, and if an actual playback amount of the information in the first day is 90, the maximum playback amount corresponding to the second day is:

$$\mathrm{MIN}\{(100*1.2+(100-80)), \mathrm{MAX}[(100*0.8+(100-80), (100*4-90-100*3*0.8)]\}=140.$$

In this way, the maximum playback amount in the second day of the information processing task is obviously greater than the pre-determined amount, the uncompleted part of the first day relative to the pre-determined amount can be made up; in addition, the number of times of playback in the second day is not excessively large (for example, exceeds the total pre-determined amount 400), and does not cause waste to the information playback inventory. Determining maximum playback amounts for the third day and the fourth day is similar to the above. Details are not described herein again.

Figure 2:
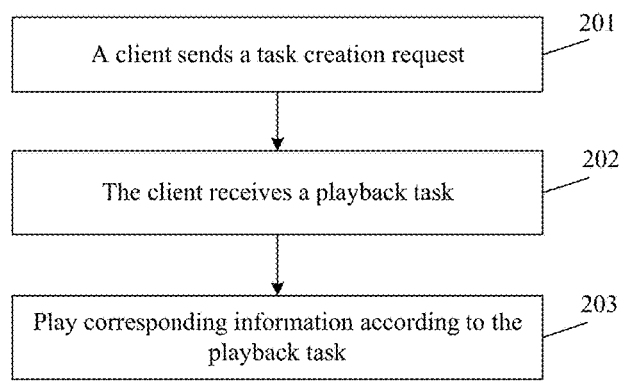
FIG. 2 is a second schematic flowchart of implementation of an information processing method in an embodiment of the present invention.

An embodiment of the present invention further records an information processing method, which can be applied to a client that plays information (which may also be understood as a client that plays information to a terminal user. FIG. 2 is a schematic flowchart of implementation of the information processing method recorded in this embodiment of the present invention. As shown in FIG. 2, the method includes:

Step 201: A client sends a task creation request.

Step 202: The client receives a playback task.

Step 203: Play corresponding information according to the playback task, so as to adjust, when a feature value of information playback is less than or equal to a preset threshold, the number of times of information playback according to a pre-determined amount of a resource by using a first playback policy, to delay reaching the pre-determined amount of the resource; and adjust, when the feature value of the information playback is greater than the preset threshold, the number of times of information playback according to the pre-determined amount of the resource by using a second playback policy, to reach the pre-determined amount of the resource in advance.

In an implementation manner, the playing corresponding information according to the playback task may be implemented in the following manner:

increasing, when a minimum playback amount is met, the number of times of information playback by using the first playback policy that is a playback policy of increasing the number of times of playback, where the minimum playback amount is determined according to the pre-determined amount of the resource, and is a minimum amount of the number of times that information is played within a current time granularity by using a resource specified by the playback task;

decreasing, when a maximum playback amount is met, the number of times of information playback by using the second playback policy that is a playback policy of decreasing the number of times of playback, where the maximum playback amount is determined according to the pre-determined amount of the resource, and is a maximum amount of the number of times that information is played within a current time granularity by using a resource specified by the playback task;

playing the corresponding information by using the resource specified by the playback task, so that the number of times of playback of the corresponding information is not less than the minimum playback amount corresponding to the playback task; and playing, after the minimum playback amount corresponding to the playback task is completed, the corresponding information by using the resource specified by the playback task, so that the number of times of playback of the corresponding information does not exceed the maximum playback amount corresponding to the playback task.

An embodiment of the present invention further records a computer storage medium, where the computer storage medium stores a computer executable instruction, and the computer executable instruction is used for executing the information processing method shown in FIG. 1, or executing the information processing method shown in FIG. 2.

Figure 3:
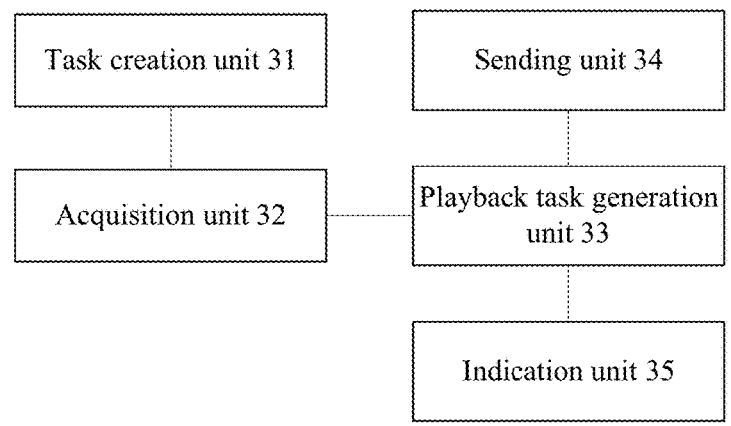
FIG. 3 is a schematic structural diagram of a server in an embodiment of the present invention.

An embodiment of the present invention further records a server. FIG. 3 is a schematic structural diagram of the server recorded in this embodiment of the present invention. As shown in FIG. 3, the server includes:

a task creation unit 31, configured to create, when a task creation request is detected, an information processing task according to a resource used for information playback and a pre-determined amount of the resource;

an acquisition unit 32, configured to detect a feature value of the information playback after acquiring the information processing task;

a playback task generation unit 33, configured to adjust, when the feature value of the information playback is less than or equal to a preset threshold, the number of times of information playback according to the pre-determined amount of the resource by using a first playback policy, to delay reaching the pre-determined amount of the resource, and generate a corresponding playback task according to the resource and the first playback policy, where the playback task generation unit 33 is further configured to adjust, when the feature value of the information playback is greater than the threshold, the number of times of information playback according to the pre-determined amount of the resource by using a second playback policy, to reach the pre-determined amount of the resource in advance, and generate a corresponding playback task according to the resource and the second playback policy; and a sending unit 34, configured to send the playback task generated by the playback task generation unit 33.

The acquisition unit 32 is further configured to trigger the detection after acquiring the information processing task, to acquire a historical record of the information playback; and analyze the historical record of the information playback, to obtain the feature value of the information playback.

The playback task generation unit 33 is further configured to determine, according to the pre-determined amount of the resource, a minimum playback amount and a maximum playback amount of the number of times that information is played within a current time granularity by using the resource, and increase, when the minimum playback amount is met, the number of times of information playback by using the first playback policy that is a playback policy of increasing the number of times of playback; and generate the playback task according to the resource, the minimum playback amount, the maximum playback amount, and the playback policy of increasing the number of times of playback.

The playback task generation unit 33 is further configured to determine, according to the pre-determined amount of the resource, a minimum playback amount and a maximum playback amount of the number of times that information is played within a current time granularity by using the information playback resource, and decrease, when the maximum playback amount is met, the number of times of information playback by using the second playback policy that is a playback policy of decreasing the number of times of playback; and generate the playback task according to the resource, the minimum playback amount, the maximum playback amount, and the playback policy of decreasing the number of times of playback.

The server further includes:

an indication unit 35, configured to determine a playback task, in a current playback task after the playback task generation unit generates the playback task, that does not complete the minimum playback amount, and instruct to play, according to the playback task, corresponding information, where the number of times of playback of the corresponding information reaches the minimum playback amount corresponding to the playback task; and instruct to play, according to the playback task, the corresponding information after the minimum playback amount corresponding to the playback task is completed, where the number of times of playback of the corresponding information does not exceed the maximum playback amount corresponding to the playback task.

The indication unit 35 is further configured to determine a product of the pre-determined amount of the resource and a first coefficient as the minimum playback amount; and determine a first sum obtained by adding up a compensation amount corresponding to the resource and a product of the pre-determined amount of the resource and a second coefficient, as the maximum playback amount, where the first coefficient is less than 1, the second coefficient is greater than 1, and the compensation amount corresponding to the resource is a first difference obtained by subtracting a second sum of pre-determined amounts of the resource before the current time granularity by the number of times that the information is already played before the current time granularity by using the resource;

the indication unit 35 is further configured to determine that the first sum is less than a maximum value in the minimum playback amount and a second difference before determining the first sum as the maximum playback amount, where the second difference is a second difference obtained by subtracting a total pre-determined amount of the resource by the number of times that the information is already played by using the resource and a product of a third sum of pre-determined amounts of the resource after the current time granularity and the first coefficient; and the indication unit 35 is further configured to determine the maximum value in the minimum playback amount and the second difference as the maximum playback amount when the first sum is greater than the maximum value in the minimum playback amount and the second difference.

During actual application, the task creation unit 31, the acquisition unit 32, the playback task generation unit 33, the sending unit 34, and the indication unit 35 all may be implemented by a central processing Unit (CPU), a digital signal processor (DSP) or a field programmable gate array (FPGA) in the server.

Figure 4:
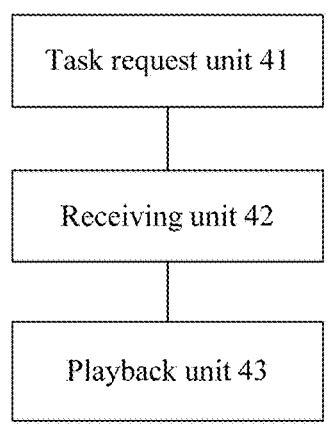
FIG. 4 is a schematic structural diagram of a client in an embodiment of the present invention.

An embodiment of the present invention further records a client. FIG. 4 is a schematic structural diagram of the client recorded in this embodiment of the present invention. As shown in FIG. 4, the client includes:

a task request unit 41, configured to send a task creation request;

a receiving unit 42, configured to receive a playback task; and a playback unit 43, configured to play corresponding information according to the playback task, so as to adjust, when a feature value of information playback is less than or equal to a preset threshold, the number of times of information playback according to a pre-determined amount of a resource by using a first playback policy, to delay reaching the pre-determined amount of the resource; and adjust, when the feature value of the information playback is greater than the preset threshold, the number of times of information playback according to the pre-determined amount of the resource by using a second playback policy, to reach the pre-determined amount of the resource in advance.

The playback unit 43 is further configured to increase, when a minimum playback amount is met, the number of times of information playback by using the first playback policy that is a playback policy of increasing the number of times of playback, where the minimum playback amount is determined according to the pre-determined amount of the resource, and is a minimum amount of the number of times that information is played within a current time granularity by using a resource specified by the playback task;

the playback unit 43 is further configured to decrease, when a maximum playback amount is met, the number of times of information playback by using the second playback policy that is a playback policy of decreasing the number of times of playback, where the maximum playback amount is determined according to the pre-determined amount of the resource, and is a maximum amount of the number of times that information is played within a current time granularity by using a resource specified by the playback task;

the playback unit 43 is further configured to play the corresponding information by using the resource specified by the playback task, so that the number of times of playback of the corresponding information is not less than the minimum playback amount corresponding to the playback task; and the playback unit 43 is further configured to play, after the minimum playback amount corresponding to the playback task is completed, the corresponding information by using the resource specified by the playback task, so that the number of times of playback of the corresponding information does not exceed the maximum playback amount corresponding to the playback task.

During actual application, the task request unit 41, the receiving unit 42, and the playback unit 43 all may be implemented by a CPU, a DSP, or an FPGA in the client.

Figure 5:
FIG. 5 is a schematic structural diagram of an information processing system in an embodiment of the present invention.

This embodiment further records an information processing system. As shown in FIG. 5, the system includes: a server 51 and a client 52. The structures of the server 51 and the client 52 are the same as those described above. Details are not described herein again.

The information processing method, device, and system recorded in the embodiments of the present invention are further described below by using a specific use scenario.

Figure 6:
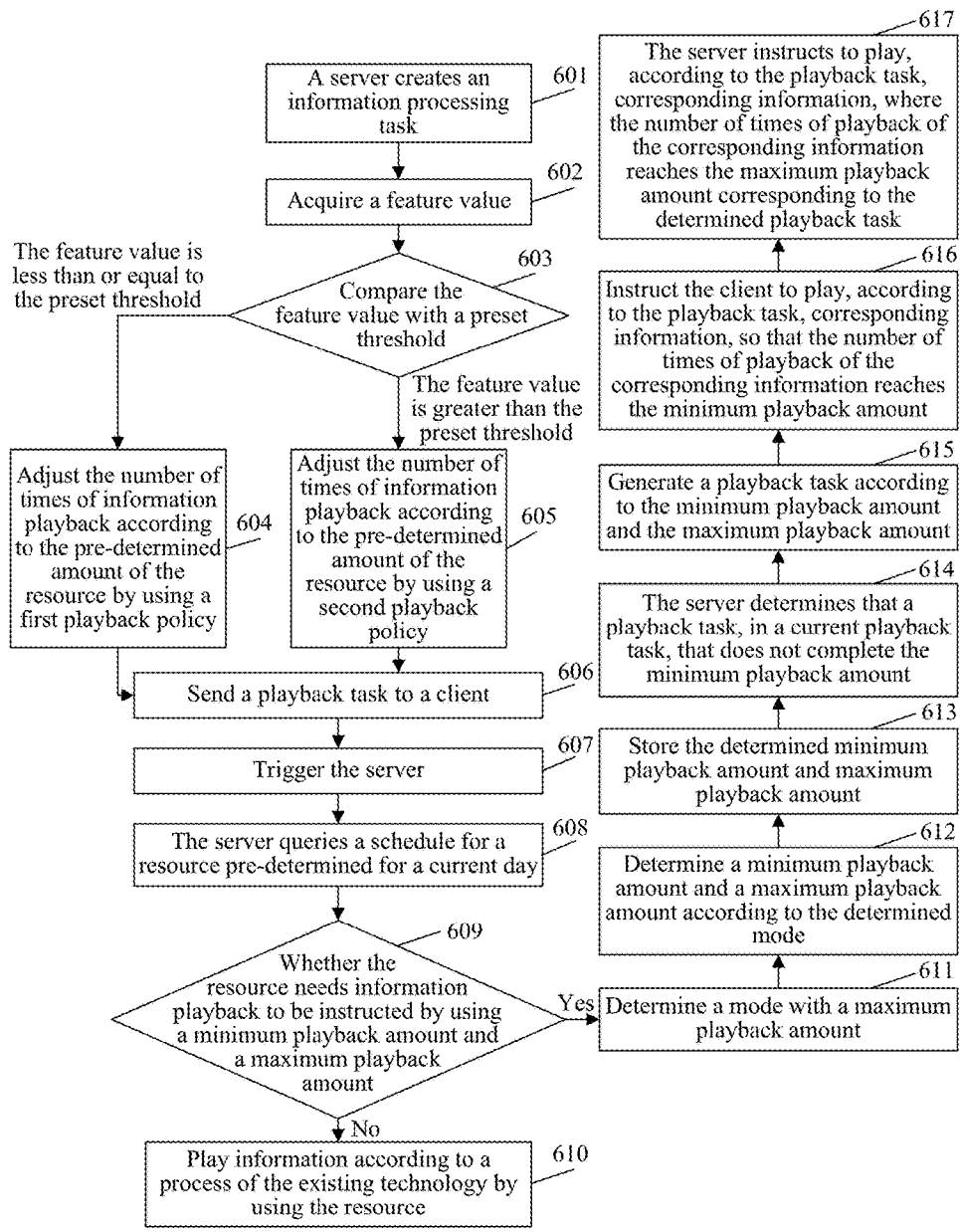
FIG. 6 is a schematic flowchart of implementation of information processing in an embodiment of the present invention.

When the information processing system performs information playback, as shown in FIG. 6, the following steps are performed:

Step 601: A server creates, when detecting a task creation request, an information processing task according to a resource used for information playback and a pre-determined amount of the resource.

Step 602: Detect a feature value of the information playback after acquiring the information processing task.

Step 603: Compare the feature value with a preset threshold, and if the feature value of the information playback is less than or equal to the preset threshold, perform step 604 and step 606; and if the feature value of the information playback is greater than the preset threshold, perform step 605 and step 606.

Step 604: Adjust the number of times of information playback according to the pre-determined amount of the resource by using a first playback policy, to delay reaching the pre-determined amount of the resource, and generate a corresponding playback task according to the resource and the first playback policy.

A minimum playback amount and a maximum playback amount of the number of times that information is played within a current time granularity by using the resource are determined according to the pre-determined amount of the resource, and when the minimum playback amount is met, the number of times of information playback is increased by using the first playback policy that is a playback policy of increasing the number of times of playback; and the playback task is generated according to the resource, the minimum playback amount, the maximum playback amount, and the playback policy of increasing the number of times of playback.

Step 605: Adjust the number of times of information playback according to the pre-determined amount of the resource by using a second playback policy, to reach the pre-determined amount of the resource in advance, and generate a corresponding playback task according to the resource and the second playback policy.

A minimum playback amount and a maximum playback amount of the number of times that information is played within a current time granularity by using the information playback resource are determined according to the pre-determined amount of the resource, and when the maximum playback amount is met, the number of times of information playback is decreased by using the second playback policy that is a playback policy of decreasing the number of times of playback; and the playback task is generated according to the resource, the minimum playback amount, the maximum playback amount, and the playback policy of decreasing the number of times of playback.

Step 606: Send the playback task to a client.

Step 607: Trigger the server.

Herein, the server may be triggered by means of: automatic invocation of a tool (for example, crontab) that periodically executes an instruction, on-premise program trigger, or manual invocation.

Step 608: The server queries the information processing task for a resource predetermined for a current day.

Step 609: Determine whether the resource needs information playback to be instructed by using a minimum playback amount and a maximum playback amount, and if yes, perform step 611; otherwise, perform step 610.

Step 610: Play information according to a process of the existing technology by using the resource.

Because of consideration of a requirement during actual application, compatibility with the information processing manner in the existing technology is implemented in this embodiment.

Step 611: Determine a mode with a maximum playback amount.

During actual application, there are two typical scenarios:

In a scenario 1, no attention is paid to an actual playback amount in each day, as long as a total pre-determined amount is completed when the information processing task ends. In a scenario 2, no large fluctuation occurs in actual playback amounts of days.

Correspondingly, the server may provide different second coefficients for selection. For example, in the scenario 1, the maximum playback amount may be determined with a second coefficient of 200%, and the actual playback amount in each day is allowed to have a large numerical value; for the scenario 2, the maximum playback amount may be determined with a second coefficient of 120%, and when information is played according to a maximum playback amount, it is allowed that the information is played according to a maximum playback amount less than that of the scenario 1.

Step 612: Determine a minimum playback amount and a maximum playback amount according to the determined mode.

The processing of determining a minimum playback amount and a maximum playback amount in this step is the same as that in Embodiment 1. Details are not described herein again.

Step 613: Store the determined minimum playback amount and maximum playback amount.

Step 614: The server determines a playback task, in a current playback task, that does not complete the minimum playback amount.

The playback task includes the minimum playback amount and maximum playback amount of a resource. In the existing technology, the playback task may further include directional information of the resource.

Step 615: Generate a playback task according to the minimum playback amount and the maximum playback amount.

Step 616: Instruct the client to play, according to the playback task, corresponding information, so that the number of times of playback of the corresponding information reaches the minimum playback amount.

During actual application, the client plays information in a user terminal; therefore, the client may also be considered as a server.

Step 617: The server instructs to play, according to the playback task, the corresponding information, where the number of times of playback of the corresponding information reaches the maximum playback amount corresponding to the determined playback task.

Before performing step 617, the server needs to determine that minimum playback amounts of all playback tasks generated in step 615 have been completed, which can avoid that a large difference occurring between the actually completed amounts of some playback tasks and the pre-determined amount causes that a total pre-determined amount of the resource in the information processing task is not completed.

It should be noted that, in step 614 to step 617, a pre-determined server may also be set in the information processing system, and the pre-determined server completes the operations of step 614 to step 617, to implement loose coupling between servers in the information processing system, facilitating maintenance and management.

As can be seen, by performing step 616, it can be ensured that at least the corresponding minimum playback amount can be completed according to the pre-determined amount of the resource in the information processing task; in addition, after the minimum playback amount of the resource is completed, step 617 is performed to play information according to the corresponding maximum playback amount, which avoids waste to an information playback inventory.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device, and system, and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The foregoing descriptions are merely preferred embodiments of the present invention, and are not intended to limit the protection scope of the present invention.

What is claimed is:

1. An information processing method, comprising:

creating, by a server when detecting a task creation request, an information processing task according to a resource used for information playback and a pre-determined amount of the resource, wherein the pre-determined amount of the resource refers to a planned number of times of which information is played by using the resource within a time granularity corresponding to the resource;

detecting a feature value of the information playback after acquiring the information processing task, wherein the feature value represents a popularity degree of the resource for information playback;

adjusting, if the feature value of the information playback is less than or equal to a preset threshold, the number of times of information playback according to the pre-determined amount of the resource by using a first playback policy, to delay reaching the pre-determined amount of the resource, and generating a corresponding playback task according to the resource and the first playback policy;

adjusting, if the feature value of the information playback is greater than the preset threshold, the number of times of information playback according to the pre-determined amount of the resource by using a second playback policy, to reach the pre-determined amount of the resource in advance, and generating a corresponding playback task according to the resource and the second playback policy; and sending the playback task;

wherein adjusting the number of times of information playback according to the pre-determined amount of the resource by using the first playback policy, to delay reaching the pre-determined amount of the resource, and generating the corresponding playback task according to the resource and the first playback policy comprises:

determining a product of the pre-determined amount of the resource and a first coefficient as the minimum playback amount; and determining a first sum obtained by adding up a compensation amount corresponding to the resource and a product of the pre-determined amount of the resource and a second coefficient, as the maximum playback amount, wherein the first coefficient is less than 1, the second coefficient is greater than 1, and the compensation amount corresponding to the resource is a first difference obtained by subtracting a second sum of pre-determined amounts of the resource before the current time granularity by the number of times that the information is already played before the current time granularity by using the resource; and correspondingly, before the determining a first sum as the maximum playback amount, the method further comprises:

determining that the first sum is less than a maximum value in the minimum playback amount and a second difference, wherein the second difference is a second difference obtained by subtracting a total pre-determined amount of the resource by the number of times that the information is already played by using the resource and a product of a third sum of pre-determined amounts of the resource after the current time granularity and the first coefficient; and determining the maximum value in the minimum playback amount and the second difference as the maximum playback amount when the first sum is greater than the maximum value in the minimum playback amount and the second difference.

2. The method according to claim 1, wherein the detecting a feature value of the information playback after acquiring the information processing task comprises:

triggering the detection after acquiring the information processing task, to acquire a historical record of the information playback; and analyzing the historical record of the information playback, to obtain the feature value of the information playback.

3. The method according to claim 1, wherein adjusting the number of times of information playback according to the pre-determined amount of the resource by using the first playback policy, to delay reaching the pre-determined amount of the resource, and generating the corresponding playback task according to the resource and the first playback policy further comprises:

increasing, when the minimum playback amount is met, the number of times of information playback by using the first playback policy that is a playback policy of increasing the number of times of playback; and generating the playback task according to the resource, the minimum playback amount, the maximum playback amount, and the playback policy of increasing the number of times of playback.

4. The method according to claim 1, wherein the adjusting the number of times of information playback according to the pre-determined amount of the resource by using a second playback policy, to reach the pre-determined amount of the resource in advance, and generating a corresponding playback task according to the resource and the second playback policy comprises:

decreasing, when the maximum playback amount is met, the number of times of information playback by using the second playback policy that is a playback policy of decreasing the number of times of playback; and generating the playback task according to the resource, the minimum playback amount, the maximum playback amount, and the playback policy of decreasing the number of times of playback.

5. The method according to claim 3, wherein after the generating the playback task, the method further comprises:

determining a playback task, in a current playback task, that does not complete the minimum playback amount, and instructing to play, according to the playback task, corresponding information, wherein the number of times of playback of the corresponding information reaches the minimum playback amount corresponding to the playback task; and instructing to play, according to the playback task, the corresponding information after the minimum playback amount corresponding to the playback task is completed, wherein the number of times of playback of the corresponding information does not exceed the maximum playback amount corresponding to the playback task.

6. The method according to claim 4, wherein after the generating the playback task, the method further comprises:

determining a playback task, in a current playback task, that does not complete the minimum playback amount, and instructing to play, according to the playback task, corresponding information, wherein the number of times of playback of the corresponding information reaches the minimum playback amount corresponding to the playback task; and instructing to play, according to the playback task, the corresponding information after the minimum playback amount corresponding to the playback task is completed, wherein the number of times of playback of the corresponding information does not exceed the maximum playback amount corresponding to the playback task.

7. An information processing method, comprising:

sending, by a client, a task creation request;

receiving, by the client, a playback task; and playing corresponding information according to the playback task, so as to adjust, when a feature value of information playback is less than or equal to a preset threshold, the number of times of information playback according to a pre-determined amount of a resource by using a first playback policy, to delay reaching the pre-determined amount of the resource; and adjust, when the feature value of the information playback is greater than the preset threshold, the number of times of information playback according to the pre-determined amount of the resource by using a second playback policy, to reach the pre-determined amount of the resource in advance;

wherein the pre-determined amount of the resource refers to a planned number of times of which information is played by using the resource within a time granularity corresponding to the resource, and the feature value represents a popularity degree of the resource for information playback;

wherein the operation of adjusting the number of times of information playback according to the pre-determined amount of the resource by using the first playback policy, to delay reaching the pre-determined amount of the resource comprises:

determining a product of the pre-determined amount of the resource and a first coefficient as the minimum playback amount; and determining a first sum obtained by adding up a compensation amount corresponding to the resource and a product of the pre-determined amount of the resource and a second coefficient, as the maximum playback amount, wherein the first coefficient is less than 1, the second coefficient is greater than 1, and the compensation amount corresponding to the resource is a first difference obtained by subtracting a second sum of pre-determined amounts of the resource before the current time granularity by the number of times that the information is already played before the current time granularity by using the resource; and correspondingly, before the determining a first sum as the maximum playback amount, the method further comprises:

determining that the first sum is less than a maximum value in the minimum playback amount and a second difference, wherein the second difference is a second difference obtained by subtracting a total pre-determined amount of the resource by the number of times that the information is already played by using the resource and a product of a third sum of pre-determined amounts of the resource after the current time granularity and the first coefficient; and determining the maximum value in the minimum playback amount and the second difference as the maximum playback amount when the first sum is greater than the maximum value in the minimum playback amount and the second difference.

8. The method according to claim 7, wherein the playing corresponding information according to the playback task comprises:

increasing, when a minimum playback amount is met, the number of times of information playback by using the first playback policy that is a playback policy of increasing the number of times of playback;

decreasing, when a maximum playback amount is met, the number of times of information playback by using the second playback policy that is a playback policy of decreasing the number of times of playback;

playing the corresponding information by using the resource specified by the playback task, so that the number of times of playback of the corresponding information is not less than the minimum playback amount corresponding to the playback task; and playing, after the minimum playback amount corresponding to the playback task is completed, the corresponding information by using the resource specified by the playback task, so that the number of times of playback of the corresponding information does not exceed the maximum playback amount corresponding to the playback task.

9. A server, comprising:

a memory storing computer-executable instructions; and one or more processors executing the computer-executable instructions to implement a plurality of program units, wherein the plurality of program units comprise:

a task creation unit, configured to create, when a task creation request is detected, an information processing task according to a resource used for information playback and a pre-determined amount of the resource, wherein the pre-determined amount of the resource refers to a planned number of times of which information is played by using the resource within a time granularity corresponding to the resource;

an acquisition unit, configured to detect a feature value of the information playback after acquiring the information processing task, wherein the feature value represents a popularity degree of the resource for information playback;

a playback task generation unit, configured to adjust, when the feature value of the information playback is less than or equal to a preset threshold, the number of times of information playback according to the pre-determined amount of the resource by using a first playback policy, to delay reaching the pre-determined amount of the resource, and generate a corresponding playback task according to the resource and the first playback policy, the playback task generation unit being further configured to adjust, when the feature value of the information playback is greater than the threshold, the number of times of information playback according to the pre-determined amount of the resource by using a second playback policy, to reach the pre-determined amount of the resource in advance, and generate a corresponding playback task according to the resource and the second playback policy; and a sending unit, configured to send the playback task generated by the playback task generation unit;

wherein the plurality of program units further comprise an indication unit configured to:

determine a product of the pre-determined amount of the resource and a first coefficient as the minimum playback amount; and determine a first sum obtained by adding up a compensation amount corresponding to the resource and a product of the pre-determined amount of the resource and a second coefficient, as the maximum playback amount, wherein the first coefficient is less than 1, the second coefficient is greater than 1, and the compensation amount corresponding to the resource is a first difference obtained by subtracting a second sum of pre-determined amounts of the resource before the current time granularity by the number of times that the information is already played before the current time granularity by using the resource;

wherein the indication unit is further configured to determine that the first sum is less than a maximum value in the minimum playback amount and a second difference before determining the first sum as the maximum playback amount, wherein the second difference is a second difference obtained by subtracting a total pre-determined amount of the resource by the number of times that the information is already played by using the resource and a product of a third sum of pre-determined amounts of the resource after the current time granularity and the first coefficient; and the indication unit is further configured to determine the maximum value in the minimum playback amount and the second difference as the maximum playback amount when the first sum is greater than the maximum value in the minimum playback amount and the second difference.

10. The server according to claim 9, wherein the acquisition unit is further configured to trigger the detection after acquiring the information processing task, to acquire a historical record of the information playback; and analyze the historical record of the information playback, to obtain the feature value of the information playback.

11. The server according to claim 9, wherein the playback task generation unit is further configured to increase, when the minimum playback amount is met, the number of times of information playback by using the first playback policy that is a playback policy of increasing the number of times of playback; and generate the playback task according to the resource, the minimum playback amount, the maximum playback amount, and the playback policy of increasing the number of times of playback.

12. The server according to claim 9, wherein the playback task generation unit is further configured to decrease, when the maximum playback amount is met, the number of times of information playback by using the second playback policy that is a playback policy of decreasing the number of times of playback; and generate the playback task according to the resource, the minimum playback amount, the maximum playback amount, and the playback policy of decreasing the number of times of playback.

13. The server according to claim 11, wherein the indication unit is further configured to determine a playback task, in a current playback task after the playback task generation unit generates the playback task, that does not complete the minimum playback amount, and instruct to play, according to the playback task, corresponding information, wherein the number of times of playback of the corresponding information reaches the minimum playback amount corresponding to the playback task; and instruct to play, according to the playback task, the corresponding information after the minimum playback amount corresponding to the playback task is completed, wherein the number of times of playback of the corresponding information does not exceed the maximum playback amount corresponding to the playback task.

14. The server according to claim 12, wherein the indication unit is further configured to determine a playback task, in a current playback task after the playback task generation unit generates the playback task, that does not complete the minimum playback amount, and instruct to play, according to the playback task, corresponding information, wherein the number of times of playback of the corresponding information reaches the minimum playback amount corresponding to the playback task; and instruct to play, according to the playback task, the corresponding information after the minimum playback amount corresponding to the playback task is completed, wherein the number of times of playback of the corresponding information does not exceed the maximum playback amount corresponding to the playback task.

15. A client, comprising:
a memory storing computer-executable instructions; and
one or more processors executing the computer-executable instructions to implement a plurality of program units, wherein the plurality of program units comprise:
a task request unit, configured to send a task creation request;
a receiving unit, configured to receive a playback task; and
a playback unit, configured to play corresponding information according to the playback task, so as to adjust, when a feature value of information playback is less than or equal to a preset threshold, the number of times of information playback according to a pre-determined amount of a resource by using a first playback policy, to delay reaching the pre-determined amount of the resource; and adjust, when the feature value of the information playback is greater than the preset threshold, the number of times of information playback according to the pre-determined amount of the resource by using a second playback policy, to reach the pre-determined amount of the resource in advance;
wherein the pre-determined amount of the resource refers to a planned number of times of which information is played by using the resource within a time granularity corresponding to the resource, and the feature value represents a popularity degree of the resource for information playback;
wherein the operation of adjusting the number of times of information playback according to the pre-determined amount of the resource by using the first playback policy, to delay reaching the pre-determined amount of the resource comprises:

determining a product of the pre-determined amount of the resource and a first coefficient as the minimum playback amount; and determining a first sum obtained by adding up a compensation amount corresponding to the resource and a product of the pre-determined amount of the resource and a second coefficient, as the maximum playback amount, wherein the first coefficient is less than 1, the second coefficient is greater than 1, and the compensation amount corresponding to the resource is a first difference obtained by subtracting a second sum of pre-determined amounts of the resource before the current time granularity by the number of times that the information is already played before the current time granularity by using the resource; and correspondingly, before the determining a first sum as the maximum playback amount, the method further comprises:

determining that the first sum is less than a maximum value in the minimum playback amount and a second difference, wherein the second difference is a second difference obtained by subtracting a total pre-determined amount of the resource by the number of times that the information is already played by using the resource and a product of a third sum of pre-determined amounts of the resource after the current time granularity and the first coefficient; and determining the maximum value in the minimum playback amount and the second difference as the maximum playback amount when the first sum is greater than the maximum value in the minimum playback amount and the second difference.

16. The client according to claim 15, wherein
the playback unit is further configured to increase, when a minimum playback amount is met, the number of times of information playback by using the first playback policy that is a playback policy of increasing the number of times of playback;
the playback unit is further configured to decrease, when a maximum playback amount is met, the number of times of information playback by using the second playback policy that is a playback policy of decreasing the number of times of playback;
the playback unit is further configured to play the corresponding information by using the resource specified by the playback task, so that the number of times of playback of the corresponding information is not less than the minimum playback amount corresponding to the playback task; and
the playback unit is further configured to play, after the minimum playback amount corresponding to the playback task is completed, the corresponding information by using the resource specified by the playback task, so that the number of times of playback of the corresponding information does not exceed the maximum playback amount corresponding to the playback task.

17. An information processing system, comprising a server and a client,
wherein the server comprises: a memory storing computer-executable instructions and one or more processors executing the computer-executable instructions to implement a plurality of program units, wherein the plurality of program units comprise:
a task creation unit, configured to create, when a task creation request is detected, an information processing task according to a resource used for information playback and a pre-determined amount of the resource;

an acquisition unit, configured to detect a feature value of the information playback after acquiring the information processing task;

a playback task generation unit, configured to adjust, when the feature value of the information playback is less than or equal to a preset threshold, the number of times of information playback according to the pre-determined amount of the resource by using a first playback policy, to delay reaching the pre-determined amount of the resource, and generate a corresponding playback task according to the resource and the first playback policy, the playback task generation unit being further configured to adjust, when the feature value of the information playback is greater than the threshold, the number of times of information playback according to the pre-determined amount of the resource by using a second playback policy, to reach the pre-determined amount of the resource in advance, and generate a corresponding playback task according to the resource and the second playback policy;

a sending unit, configured to send the playback task generated by the playback task generation unit; and an indication unit, configured to determine a product of the pre-determined amount of the resource and a first coefficient as the minimum playback amount, and determine a first sum obtained by adding up a compensation amount corresponding to the resource and a product of the pre-determined amount of the resource and a second coefficient, as the maximum playback amount, wherein the first coefficient is less than 1, the second coefficient is greater than 1, and the compensation amount corresponding to the resource is a first difference obtained by subtracting a second sum of pre-determined amounts of the resource before the current time granularity by the number of times that the information is already played before the current time granularity by using the resource;

wherein the indication unit is further configured to determine that the first sum is less than a maximum value in the minimum playback amount and a second difference before determining the first sum as the maximum playback amount, wherein the second difference is a second difference obtained by subtracting a total pre-determined amount of the resource by the number of times that the information is already played by using the resource and a product of a third sum of pre-determined amounts of the resource after the current time granularity and the first coefficient; and the indication unit is further configured to determine the maximum value in the minimum playback amount and the second difference as the maximum playback amount when the first sum is greater than the maximum value in the minimum playback amount and the second difference;

and wherein the client comprises: a memory storing computer-executable instructions and one or more processors executing the computer-executable instructions to implement a plurality of program units, wherein the plurality of program units comprise:

a task request unit, configured to send the task creation request;

a receiving unit, configured to receive the playback task; and a playback unit, configured to play corresponding information according to the playback task, so as to adjust, when a feature value of information playback is less than or equal to a preset threshold, the number of times of information playback according to the pre-determined amount of the resource by using the first playback policy, to delay reaching the pre-determined amount of the resource; and adjust, when the feature value of the information playback is greater than the preset threshold, the number of times of information playback according to the pre-determined amount of the resource by using the second playback policy, to reach the pre-determined amount of the resource in advance;

wherein the pre-determined amount of the resource refers to a planned number of times of which information is played by using the resource within a time granularity corresponding to the resource, and the feature value represents a popularity degree of the resource used for information playback.

* * * * *